(12) United States Patent
Fleckenstein

(10) Patent No.: US 8,299,388 B2
(45) Date of Patent: Oct. 30, 2012

(54) FINNED RESISTANCE SPOT WELDING ELECTRODE

(75) Inventor: David C. Fleckenstein, Indianapolis, IN (US)

(73) Assignee: CMW International, Inc., Indianapolis, IN (US)

( * ) Notice: Subject to any disclaimer, the term of this patent is extended or adjusted under 35 U.S.C. 154(b) by 343 days.

(21) Appl. No.: 12/739,422

(22) PCT Filed: Oct. 22, 2008

(86) PCT No.: PCT/US2008/080689
§ 371 (c)(1),
(2), (4) Date: Apr. 23, 2010

(87) PCT Pub. No.: WO2009/055411
PCT Pub. Date: Apr. 30, 2009

(65) Prior Publication Data
US 2010/0243613 A1    Sep. 30, 2010

Related U.S. Application Data

(60) Provisional application No. 60/982,632, filed on Oct. 25, 2007.

(51) Int. Cl.
*B23K 3/00* (2006.01)
(52) U.S. Cl. ............................................. 219/85.16
(58) Field of Classification Search ............... 219/69.1, 219/76.14, 85.16
See application file for complete search history.

(56) References Cited

U.S. PATENT DOCUMENTS

| | | | |
|---|---|---|---|
| 2,351,230 A | 6/1944 | Powell | |
| 2,446,932 A | 8/1948 | Johnson | |
| 2,513,323 A | 7/1950 | Hensel et al. | |
| 2,829,239 A | 4/1958 | Boretti | |
| 3,511,963 A | 5/1970 | Chmiel | |
| 4,476,372 A | 10/1984 | Prucher | |
| 4,588,870 A | 5/1986 | Nadkarni et al. | |
| 4,678,887 A | 7/1987 | Nagel et al. | |
| 4,728,765 A | 3/1988 | Prucher | |
| 4,760,235 A | 7/1988 | Flater | |
| 5,021,627 A | 6/1991 | Bersch et al. | |
| 5,041,711 A * | 8/1991 | Prucher ........................ | 219/119 |
| 5,126,528 A | 6/1992 | Bush et al. | |
| 5,349,153 A | 9/1994 | Prucher | |
| 6,225,591 B1 | 5/2001 | Nippert et al. | |
| 2006/0261046 A1 | 11/2006 | Scotchmer | |

FOREIGN PATENT DOCUMENTS

| | | |
|---|---|---|
| DE | 19828798 A1 | 12/1999 |
| JP | 2855376 B2 | 11/1998 |
| KR | 10-2000-0070471 | 11/2000 |

OTHER PUBLICATIONS

Jeremy Leonard Caron, Laboratory and Production Testing of Novel Resistance Spot Welding Electrodes, Oct. 26, 2006, pp. 1-71, University of Windsor, Canada. International Search Report from related PCT/US2008/080689 issued Nov. 13, 2008.
Written Opinion of the International Searching Authority from related PCT/US2008/080689 issued May 29, 2009.
P.R. Mallory & Co., Catalog, 1974 Resistance Welding Products: Electrodes, Electrode Holders, Accessories, cover page and pp. 2, 3, 4, 5, 7, 9, 10, 11, 12 and 47.

* cited by examiner

*Primary Examiner* — Jenny L Wagner
(74) *Attorney, Agent, or Firm* — Woodard, Emhardt, Moriarty, McNett & Henry LLP

(57) ABSTRACT

Disclosed is a cooled welding electrode with a plurality of fins in the water well, where the fins are tapered between approximately 10 degrees and 45 degrees.

16 Claims, 7 Drawing Sheets

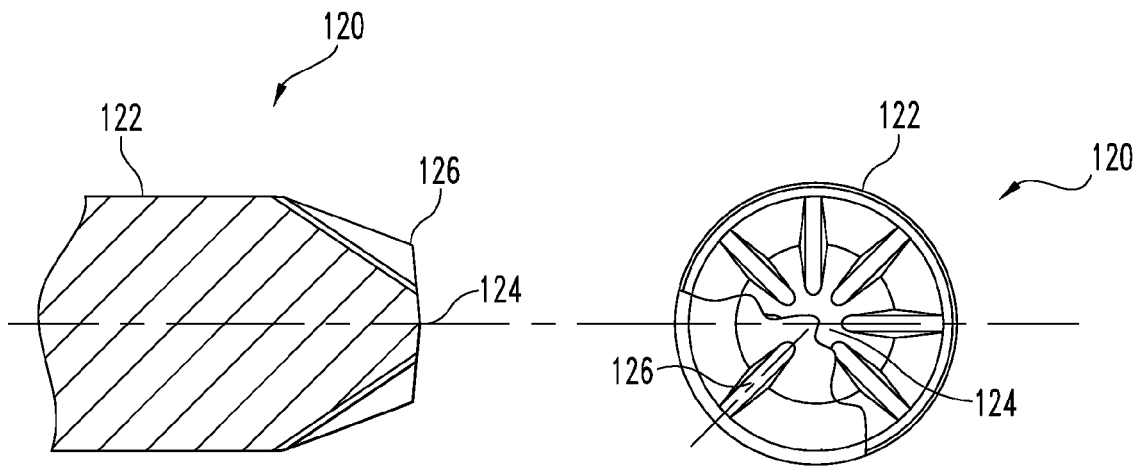
*Fig. 7*  *Fig. 8*
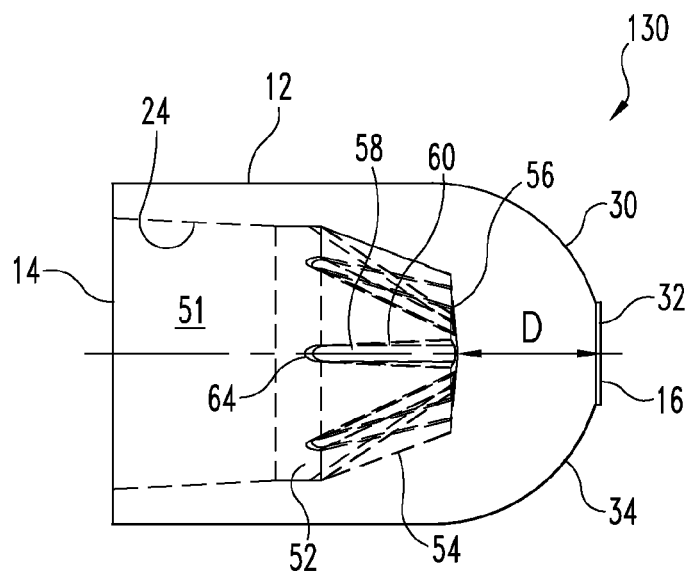
*Fig. 9*

US 8,299,388 B2

FINNED RESISTANCE SPOT WELDING ELECTRODE

CROSS-REFERENCE TO RELATED APPLICATIONS

The present application is a national stage application of International Patent Application No. PCT/US2008/080689 filed Oct. 22, 2008, which claims the benefit of U. S. Provisional Application No. 60/982,632 filed Oct. 25, 2007, both of which are hereby incorporated by reference in their entirety.

BACKGROUND

The present disclosure relates to finned resistance spot welding electrodes.

Sheet steel has historically been the primary material used in automobile construction; however, significant quantities of specialized materials, including aluminum, TRIP steels, duplex steels, dual phase steels and coated high strength steels are currently also being used. The selection of these new materials is often based on either reducing the weight of the vehicle to meet improved fuel economy standards or increasing the strength of the vehicle to meet new safety regulations for crash situations. Although a variety of joining processes are utilized, resistance spot welding (RSW) is the primary process used to join members in assembly operations. This process is favored due to its inherently low capital and operating costs as well as its adaptability for use in mass production. However, high standards of weld quality and repeatable reliability are needed to take advantage of these other benefits.

For example, TRIP steels (transformation induced plasticity steels) include three separate phases of material. Traditional RSW techniques have proven to provide less than satisfactory results as traditional RSW techniques have resulted in low weld quality due to embrittled welds. It has been theorized that traditional RSW techniques result in a rapid heat up and cool down, wherein the rapid cool down, when used on TRIP steel, embrittles the weld nugget resulting in the reduction in strength of the weld.

In response to this phenomenon, manufacturers have altered their weld cycles to provide a gradual reduction in temperature by incrementally decreasing the current during cool down instead of simply turning the current off. While this appears to reduce the problem with embrittled welds, it places a higher heat load on the welding electrode as high heat conditions are maintained for a greater period of time. This can lead to premature electrode failures and quality control problems.

Another problem that has been encountered in RSW manufacturing environments is electrode wear. Electrode wear primarily occurs in two ways. First, electrode wear can result from extrusion of electrode material from the face of the electrode during welding operations. This phenomenon has been termed "mushrooming." This may occur due to a combination of high heat generated during the welding process and high clamping force applied by the electrodes to the parts.

A second mechanism of electrode wear involves disposition of alloys from the electrode face onto the sheet steel surface during the retraction of electrodes. Heating the electrode face promotes brass alloying and bonding of the top layer of the electrode face in the seal surface. This both enlarges and roughens the electrode face.

These deposited alloys are not easily detected as they may appear to be similar to galvanized coatings. Traditional solutions to electrode wear include controlling the operating current level, weld time, hold time, electrode cooling, electrode geometry and other factors. The rate of electrode face enlargement from these two mechanisms is related to the energy generated at the electrode sheet interface and the heat passing from the weld to the electrode face to a water cooled channel within the electrode. Heat can reduce the material strength of the electrode by annealing the cold work structure of the electrode. These kinds of electrode degradation decrease the current density in the steel sheet which results in reduced heat at the weld site that may eventually cause a reduced nugget size or even the elimination of a weld altogether.

The effects of electrode wear can be alleviated by either systematically increasing the weld current to account for the greater size of the welding electrodes caused by "mushrooming" or by re-conditioning (dressing) the electrode tip and face to return the electrode surface to its original size.

BRIEF DESCRIPTION OF THE DRAWINGS

FIG. 7 is a cross-sectional view of a die tool used in the process of FIG. 6.

FIG. 8 is a plan view of the die tool illustrated in FIG. 7.

FIG. 9 is a side view of a B-nosed style spot welding electrode incorporating an enlarged water well that includes a plurality of fins.

DETAILED DESCRIPTION

Figure 1:
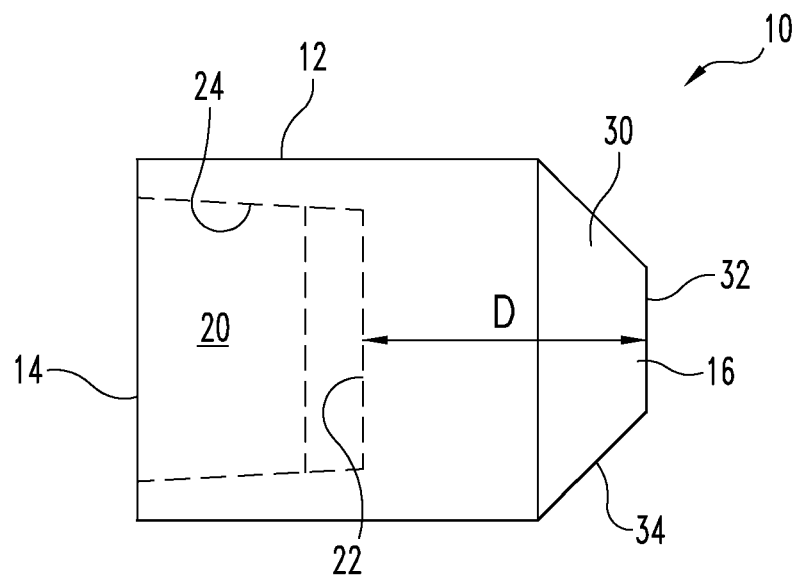
FIG. 1 is a side view of a prior art welding electrode.

For the purposes of promoting an understanding of the principles of this disclosure, reference will now be made to certain embodiments thereof and specific language will be used to describe the same. It will nevertheless be understood that no limitation of the scope of this disclosure is thereby intended, such alterations, further modifications and further applications of the principles as described herein being contemplated as would normally occur to one skilled in the art to which this disclosure relates. In several FIGs., where there are the same or similar elements, those elements are designated with the same or similar reference numerals.

Referring now to FIG. 1, depicted is a prior art spot welding electrode 10, which includes housing 12, open-end 14, and closed-end 16. Housing 12 includes water well 20 formed therein extending from open-end 14 towards inner wall 22 with inner wall 22 being in the direction of closed-end 16. Water well 20 also includes mounting portion 24. Mounting portion 24, in the illustrated embodiment, is a tapered hole adapted to interface with the male taper on a welding electrode adapted body (not illustrated). However, any known mounting means may be used including, but not limited to, threaded or any other attachment configuration known in the industry to provide for mounting spot welding electrode 10 to a male or female electrode adapter which may be part of an individual welding gun or resistance welding machine. Mounting portion 24 serves to provide a water tight seal with a male or female electrode adapter and also serves to transfer compression forces from electrode 10 to the male or female electrode adapter.

Spot welding electrode 10 also includes tip portion 30. Tip portion 30 includes weld surface 32 and electrode taper 34. Electrode taper 34 in the illustrated embodiment is a 45 degree taper consistent with E-nose standard electrode geometry.

Weld surface 32 in the illustrated embodiment approximates a circular weld surface. The size of weld surface 32 is a factor in selecting an individual electrode for a given task. Electrode face diameter directly impacts the current density, defined as the welding current divided by the contact area of weld surface 32. If weld surface 32 is too small, a high current density may cause severe heat concentration and excessive surface indentation. If weld surface 32 is too large, the current density may drop below a minimum required level to make an acceptable weld. Weld surface 32, for a particular application, is generally selected based upon the thickness of the work piece to be welded and the desired size of the weld nugget to be produced.

Electrodes are generally equipped with water cooling passages to extract heat from electrodes and work pieces. Heat from the welding process is conducted through the electrode to cooling water passing through the water cooling channels. FIG. 1 depicts distance D, which represents the distance between weld surface 32 and inner wall 22. Distance D can be referred to as face thickness. Face thickness D, in conjunction with water cooling channels, which are a part of male or female electrode adapter (not shown), generally control electrode cooling. The position of any cooling tube as related to inner wall 22 can also effect the rate of cooling of electrode 10. While this disclosure discusses the cooling fluid in terms of water, other cooling fluids or combinations, as known in the art, can be used with the finned electrode disclosed herein.

Another consideration that impacts selecting face thickness D for a particular application is that electrodes are commonly redressed as mushrooming or face extrusion occurs and weld surface 32 increases in size. Electrode 10 could be reworked (dressed) to remove a small amount (approximately 0.020" to 0.040"). This process can be repeated several times and, in some embodiments, up to 0.200" of material can be removed from electrode 10 before electrode 10 is removed for recycling and reclamation. In selecting an initial face thickness D, expected redressing should be accounted for so that after a complete redressing has been performed, face thickness D is still above a minimum acceptable threshold.

Another consideration and difficulty encountered with the selection and use of electrodes of this kind can be the formation for brass alloy on the surface of the electrode during use, as mentioned above, which can reduce both its immediate and long-term performance. This may occur from a combination of zinc build-up from coatings encountered and also the copper from the electrode surface itself. The resulting problem is significantly lessened due to the increased cooling and efficiency achieved with the various embodiments disclosed herein, which among other things minimize the exposure time of the molten zinc coatings to the heated copper electrode surface.

Regarding a minimum acceptable threshold for face thickness D, there are several countervailing interests that impact the acceptable and unacceptable performance range for face thickness D. Maximum cooling may occur when there is balance between conduction and convection. Conduction through electrode 10 is in part dependent upon electrode face thickness D. When face thickness D is larger than necessary, less cooling is achieved by the cooling water as the heat must conduct over a longer distance before it reaches water well 20 and a larger temperature gradient can exist between weld surface 32 and inner wall 22. Conversely, if face thickness D is too thin, heat can build up near weld surface 32 as a result of a reduction in thermal mass. Furthermore, as reducing electrode face thickness D positions water well 20 closer to the highest temperature experienced at weld surface 32, reducing the overall thermal mass of electrode 10 too much may result in vaporizing the water in water well 20. If vaporizing occurs, the resulting steam can act as an insulating barrier between electrode 10 and the water in water well 20, substantially reducing the ability of the water to remove heat from electrode 10.

Figure 2:
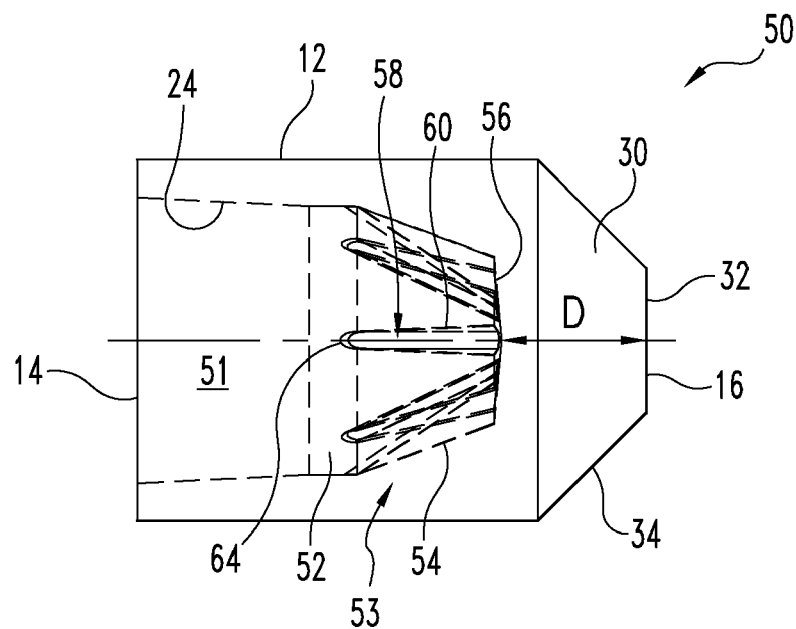
FIG. 2 is a side view of an E-nosed style spot welding electrode incorporating an enlarged water well that includes a plurality of fins.
Figure 3:
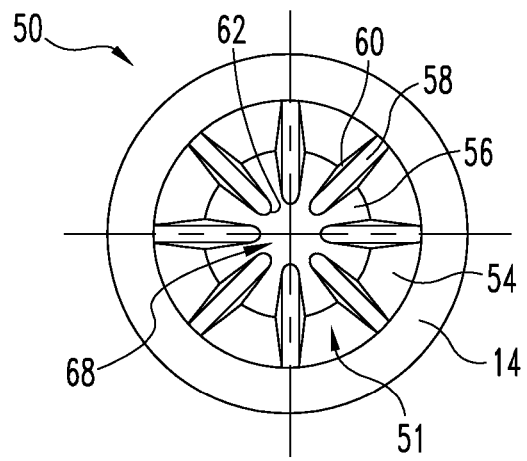
FIG. 3 is a plan view of the electrode illustrated in FIG. 2.
Figure 4:
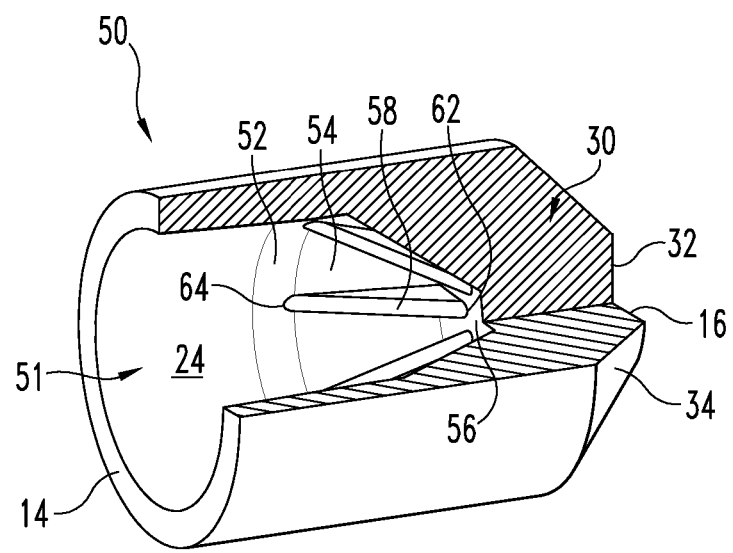
FIG. 4 is a perspective view, including a cross sectional cutaway, of the electrode illustrated in FIG. 2.

Referring now to FIGS. 2, 3 and 4, finned electrode 50 is depicted. Finned electrode 50 includes housing 12, open-end 14, closed-end 16, water well 51 and tip portion 30. Water well 51 includes mounting portion 24, sidewall portion 53, inner wall 56 and a plurality of fins 58. Sidewall portion 53 includes straight wall portion 52 and conical portion 54. Tip portion 30 includes electrode taper 34 and weld 32 with face thickness D illustrated between inner wall 56 and weld surface 32.

Referring specifically to FIG. 2, finned electrode 50 is depicted with water well 51 located substantially deeper in housing 12 as compared to water well 20 as depicted in the prior art example in FIG. 1. Assuming the overall length of housing 12 is similar between finned electrode 50 and electrode 10 it should be apparent that face thickness D for finned electrode 50 is shorter than face thickness D for electrode 10. Accordingly, in embodiments utilizing water well 51 as depicted in FIG. 2, finned electrode 50 may need to include a comparatively longer housing 12 to allow an appropriate face thickness D to be incorporated therein.

Another consequence of increasing the size and depth of water well 51 as compared to prior art water well 20 is a potential reduction in strength in housing 12 for finned electrode 50. It should be apparent that at some point when increasing the size (depth and/or width) of water well 51, a critical point will be reached wherein the strength of the material surrounding conical portion 54 would be sufficiently reduced such that the area around conical portion 54 becomes the weakest point in the cap. As it is contemplated that finned electrode 50 can be used in a high heat situation under significant compression loads, one potential failure mode is the collapse of housing 20 due to that compressive load encountered during spot welding operations. It has been found that the inclusion of a plurality of fins 58 around the circumference of inner wall 56 can and does act as structural reinforcements or stiffeners which increase the overall strength and rigidity of housing 12. Thus, the addition of a plurality of fins 58 to water well 51 in the embodiments disclosed herein permits the use of a larger water well 51 than would otherwise be possible or expected without the plurality of such fins 58.

Another purpose of water well 51, as compared to and different from water well 20 of the prior art, is to provide increased surface area between housing 12 and the cooling water (not illustrated), thereby increasing the overall amount of heat that can be removed by the cooling water during use. In the illustrated embodiment, this has been accomplished by making water well 51 larger through the inclusion of conical portion 54 and by moving inner wall 56 further away from open end 14. As described above, a plurality of fins 58 have also been included around the periphery of conical portion 54. In the illustrated preferred embodiment, which includes 8 such fins 58, the overall surface area of water well 51 for heat transfer purposes is approximately 215 percent (%) larger than the surface area provided by water well 20 as depicted in FIG. 1. At the same time, it is contemplated and intended that more or less fins in number from the illustrated 8 may and can be used in different embodiments and applications and still achieve the effects described herein. For example, the number of fins in other embodiments of the electrodes may range from approximately 6 or less up to approximately 10 or more depending on factors such as the material and method of manufacture used, the size and applications intended, and the increased cooling surface area and effect desired in the given situation.

Figure 5:
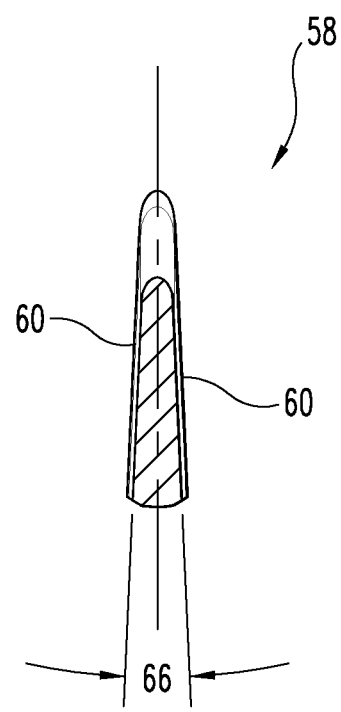
FIG. 5 is a cross-sectional view of one fin depicted in FIGS. 2-4.

Referring now to FIGS. 3 and 4. Several details of individual fins 58 are depicted in detail, including tapered sides 60, rounded transition 62 and rounded transition 64. Referring also to FIG. 5, a cross sectional view of a single fin 58 is illustrated depicting tapered sides 60 and tapered angle 66. In this regard, there are several considerations to be taken into account when electing various embodiments of tapered angle 66. As tapered angle 66 increases, for example, the overall surface area of water well 51 will be reduced wherein as tapered angle 66 decreases, the surface area of water well 51 will be increased. As for strength, as tapered angle 66 decreases, less structural support or stiffening will be provided by fins 58 to the electrode body. Similarly, a larger tapered angle 66 provides comparatively greater structural support and stiffening from each individual fin 58 in the embodiment.

From investigations and testing thus far, the illustrated embodiment in FIGS. 2-5 have shown and appears to provide a good balance between these and competing factors. In the illustrated embodiment, for example, tapered angle 66 is approximately 22 degrees. It has been found that this tapered angle provides a combination of adequate cooling and adequate structural support and stiffening as well as aiding in the manufacturing process, for example, by facilitating and expediting the release of the forming die as will be discussed in greater detail further herein. However, at the same time other tapered angles 66 may be appropriate and function with similarly suitable results for different materials and/or applications. With that in mind, for example, an acceptable range of tapered angles 66 would include approximately 10 to approximately 45 degrees as may be preferred or dictated by the individual performance needs or circumstances at hand.

Another feature of fins 58, as apparent in FIGS. 2-5, is that each fin 58 only extends between inner wall 54 and conical portion 54. It is also relatively small with a rounded transition passing over to touch portions of straight wall portion 52. No portion of fin 58 extends or is cantilevered into water well 51 in the illustrated embodiment, i.e., fins 58 do not extend above the line connecting sidewall 53 and inner wall 56. Furthermore, the preferred fins 58 do not contact each other, leaving open area 68 in the middle of inner wall 56. This feature may and has in fact shown from testing thus far to increase the life of the tooling used to form the finned electrode 50, such as punch 120 as described below. Open area 68 may and has also been shown to aid the overall cooling process by providing an area that a water tube (not illustrated) can be located so that the water discharge is in close proximity with inner wall 56. This can and does also aid overall cooling by reducing any water stagnation in water well 51. Furthermore, open area 68 can and does further have the effect of allowing the flow of the cooling water to be subdivided prior to passing over each individual fin 58. Fins 56 are angled up from inner wall portion 56 at an angle between approximately 20 and 40 degrees to sidewall portion 53.

Figure 6:
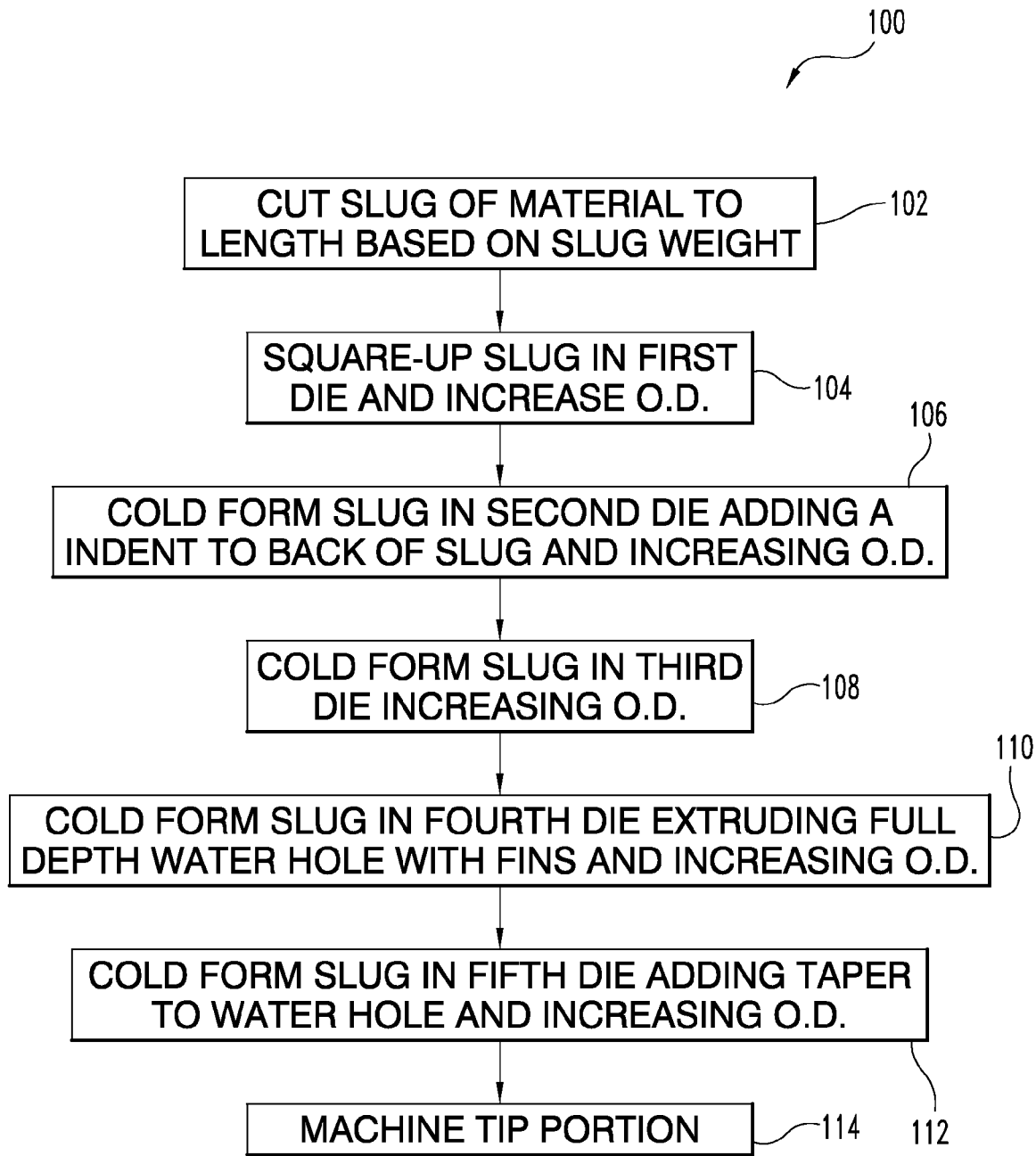
FIG. 6 is a process flow diagram detailing one embodiment of manufacturing a finned electrode.

Referring now to FIG. 6, procedure 100 is illustrated. Procedure 100 is one method for manufacturing the finned electrode 50 as described above. Procedure 100 begins with step 102 where a slug of material is cut to length based on weight. The target length may be established through trial and error or other techniques known in the art such that the cut slug weighs a predetermined amount sufficient to form the finned electrode 50. Procedure 100 continues with step 104 where the slug cut in step 102 is squared up in a first die and the outside diameter is increased from 0.600" diameter to approximately 0.605" to 0.608".

Procedure 100 continues with step 106 where the slug is cold formed in a second die to add an indent to the back of the slug and further increase the outside diameter. In one embodiment, the outside diameter is increased to approximately 0.610" to 0.612" OD while the indent in the back of the slug is approximately 0.465" ID and approximately 0.040" deep. Procedure 100 continues with step 108 where the slug is cold formed in a third die to further increase the OD. In one embodiment, the OD is increased to approximately 0.618" to 0.620" overall. Procedure 100 continues with step 110 where the slug is cold formed in a fourth die which extrudes the full depth water hole including the desired fins and the OD is further increased. It should be noted that in embodiments when mounting portion 24 is a tapered hole, then the tapered hole is not included in step 110 and instead that portion of the extruded water hole can remain at the approximately diameter of straight wall portion 52. In one embodiment, for example, the OD is expanded to approximately 0.622".

Procedure 100 in the illustrated embodiment then continues with step 112 where the slug is cold formed in a fifth die to add mounting portion 24 and taper to the water hole and to further increase the OD. In one embodiment, the final outside diameter is approximately 0.625" and the taper is at approximately 2° 50'53" to 2° 56'53" angle and is approximately 0.379" to 0.399" deep. Procedure 100 concludes with step 114 where tip portion 30 is machined onto finned electrode 50 (or any other configuration desired).

In addition, still other methods and embodiments of manufacturing a finned electrode 50 are also contemplated by and intended to be covered by the disclosures herein. For example, in some embodiments it may be possible to also form tip portion 30 in step 110 while the water hole is being extruded to its full depth. In that case, step 114 may be superfluous or may be retained to perform some other finishing step or operation.

Referring now to FIGS. 7 and 8, one embodiment of a punch 120 is shown. Punch 120 represents one of the die components that can be and has been used effectively in procedure 100 when water hole 51 is extruded to the full depth in step 110. Punch 120, for example, includes side walls 122 and 124 and a plurality of fin recesses 126. In one embodiment, punch 120 is manufactured of standard CPM M-4 material although other suitable materials are available and work equally well under given circumstances and conditions.

Referring now to FIG. 9, an embodiment of a B-nosed finned electrode 130 is depicted including water well 51 as described above. Finned electrode 130 includes housing 12, open end 14, closed end 16, tip portion 30, and weld surface 32, substantially as described above. Finned electrode 130 also includes electrode taper 34 which corresponds to a hemispherical shape as requested for a B-nosed configuration.

Figure 10:
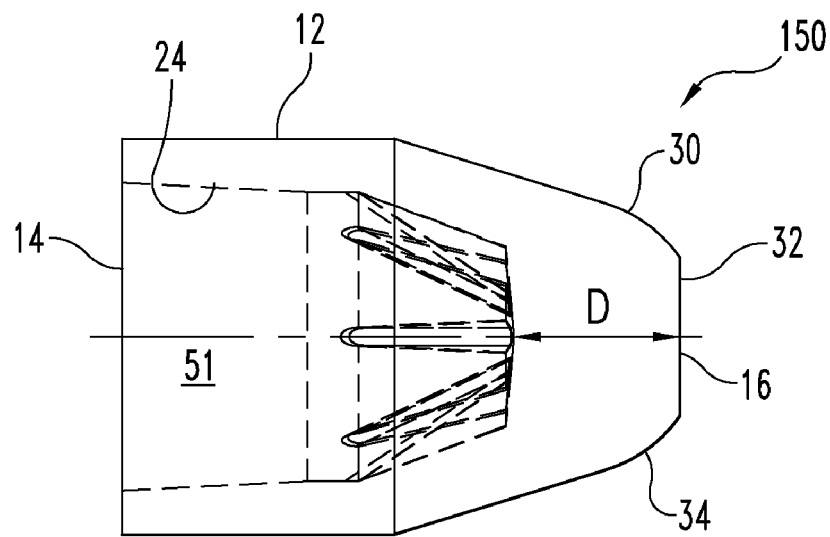
FIG. 10 is a side view of an A-nosed style spot welding electrode incorporating an enlarged water well that includes a plurality of fins.

Referring now to FIG. 10, an embodiment of an A-nosed finned electrode 140 is depicted incorporating water well 51 as substantially described above. Finned electrode 140 includes housing 12, open end 14, closed end 16, tip portion 30, weld surface 32, as substantially described above. Finned electrode 130 also includes electrode taper 34 which corresponds to a parabolic shape as required by the A-nosed specification.

Figure 11:
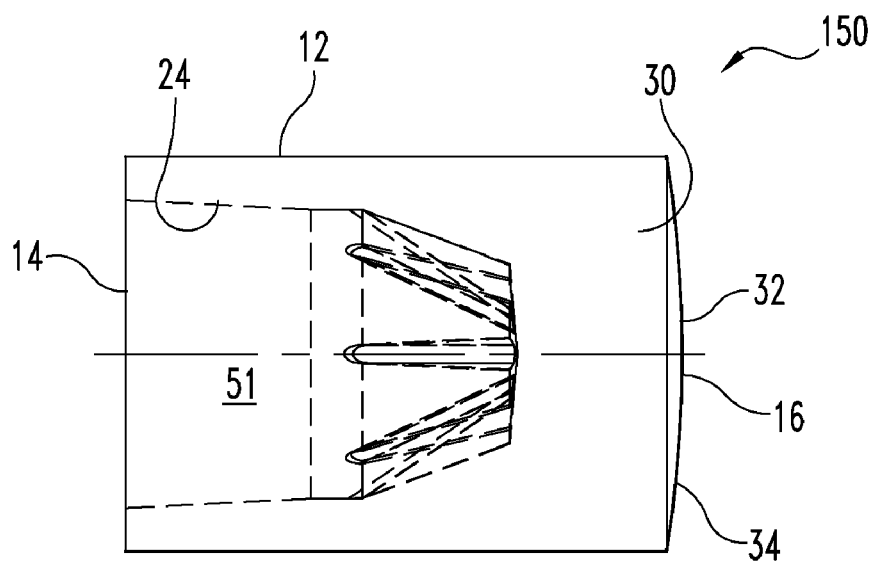
FIG. 11 is a side view of an F-nosed style spot welding electrode incorporating an enlarged water well that includes a plurality of fins.

Referring now to FIG. 11, an embodiment of a F-nosed finned electrode 150 is depicted incorporating water well 51 substantially as described above. Finned electrode 150 includes housing 12, open end 14, closed end 16, tip portion 30, weld surface 32, as substantially described above. Finned electrode 150 also includes electrode taper 34 which corresponds to a slightly rounded tip as required for an F-nosed specification.

Still further, preferred water well 51 as described herein can also be incorporated in other electrode shapes including, but not limited to, commonly known C-nosed, D-nosed and G-nosed electrodes as well as other known configurations common or uncommon in the art. Individual design considerations for each electrode are dependent upon actual applications, and water well 51 can be adapted to each said electrode incorporating the teachings described herein.

In one embodiment, for example, the amount of water flow to cool finned electrodes 50, 130, 140 or 150 is approximately 1.5 to 2 gallons per minute (gpm). In another embodiment, the amount of water flow is adjustable so that the water flow can be adjusted to optimize welding conditions at the time. In another embodiment, the water flow is not adjustable and the cross-sectional area of water well 51 can be adjusted (even during manufacture) in order to optimize welding conditions for that particular application being performed.

There are also several different materials from which the preferred finned electrodes described herein can be manufactured. Some suitable electrode materials have high electrical conductivity, for example, to carry the weld current to the work piece and high thermal conductivity to conduct heat away from the weld zone to aide in nugget solidification after welding has occurred. Some other electrode materials also have adequate high temperature strength to resist mechanical deformation caused by repeated application of electrode force under high temperature conditions.

However, there are also competing interests involved once again in the matter of such material selection. Regarding electroconductivity, for example, the electroconductivity of the welding tip electrode should be higher than the electroconductivity of the material being welded. Otherwise, the heat generated by the current passing through the electrode and the work piece could be concentrated in the welding tip of the electrode rather than the work piece. Another consideration for material selection is the amount of force that will be required to be exerted by and with the welding tip electrode. For applications where there is a good fit between the parts being welded, for example, when dealing with parts that have been stamped to a tight tolerance, then lower clamping forces may be required such that the welding tip electrode material could be made of comparatively softer or less hard material as the forces on the tip could be comparatively reduced while still having comparable electrode life. Conversely, when materials to be welded have a poor fit, as is common in industry, then higher electrode forces may be required to bring the materials being welded together during the welding process. In this situation, harder and more heat resistant material may be preferred to permit higher clamping forces while resisting degradation of the electrode welding surface due to material expulsion during welding.

Electrode materials have been typically categorized by the Resistance Welding Manufacturers Alliance (RWMA), a standing committee of the American Welding Society into several groups including groups A and B as shown in Table 1 below. In general, RWMA group A materials consist of copper alloys that obtain strength from a combination of the alloy material through treatment and cold working. Group A, class 1 materials have comparatively high electrical conductivity and are recommended for welding aluminum and magnesium alloys where the conductivity of the welding material is also relatively high. Class 1 materials include copper zirconium (CuZr) and copper cadmium (CuCd) alloys. In general, the copper zirconium material is more common than the copper cadmium material as many users wish to avoid cadmium due to its hazardous characteristics. On the other hand, cadmium appears to provide improved resistance to sticking to the work part during welding in some applications.

Group A, class 2 materials have comparatively lower electrical conductivity and a comparatively higher mechanical property than class 1 materials. Class 2 materials are considered general purpose electrode materials that are usable in a wide range of materials and conditions. Class 2 materials include copper chromium (CuCr) and copper chromium zirconium (CuCrZr) alloys.

TABLE 1

| RWMA Group | Class | Compositions | HRB | Minimum Electrical Conductivity (IACS) |
|---|---|---|---|---|
| A | 1 | CuZr, CuCd | 55 to 65 | 80 |
|   | 2 | CuCr, CuCrZr | 65 to 75 | 75 |

The embodiments illustrated in FIGS. 2-5 above, for example, may be made of either class 1 or class 2 materials. However, use of class 2 material may require some modifications to the configuration of the fins as described here. Specifically, it may be beneficial to reduce the number of fins to 6 or 4 and/or to increase the tapered angle 66 in such situations.

Figure 12:
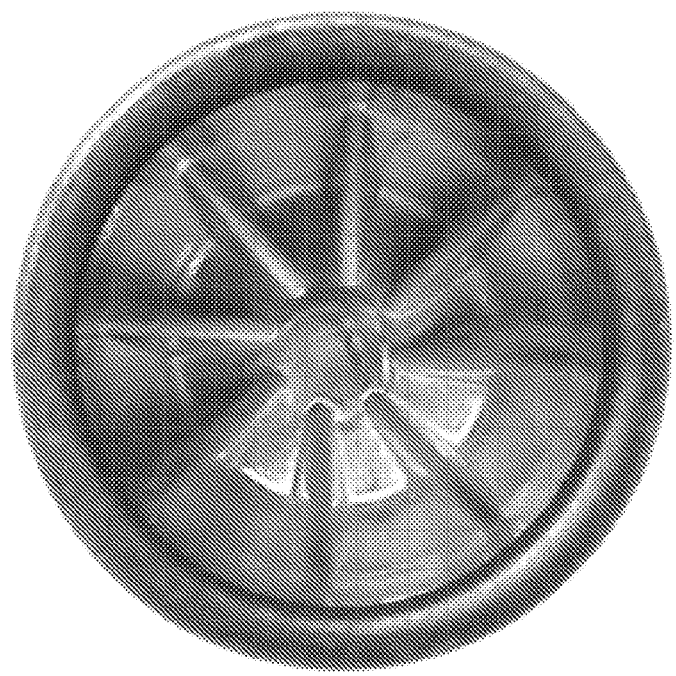
FIG. 12 is a photograph of one embodiment of an actual finned water well.
Figure 13:
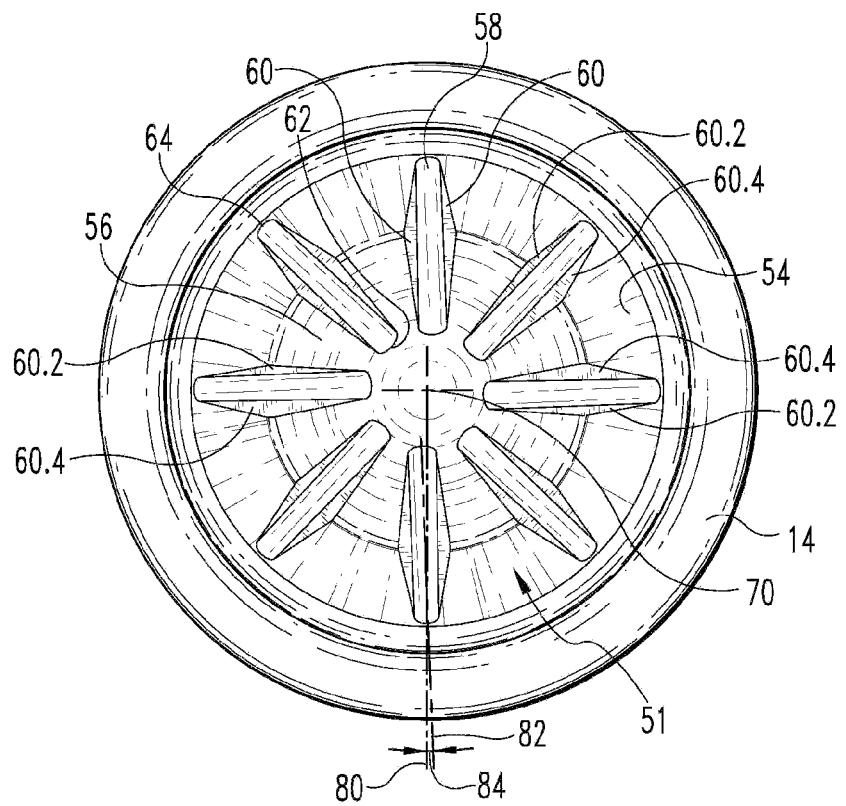
FIG. 13 is a plan view depicting the finned water well shown in FIG. 12.

During manufacturing and testing thus far, another embodiment of the preferred finned electrodes 50 were produced wherein the plurality of fins 58 were not symmetrical in their placement or orientation in water hole 51. This embodiment of the finned configuration is depicted in FIGS. 12 and 13, where FIG. 12 is an actual photograph taken of water well 51 and FIG. 13 is a drawing based on FIG. 12. During testing performed to date, these slightly slanted or canted fins have provided even more beneficial effects and results in cooling which has been theorized to be the result at least in part of increased turbulence or a possible swirling of the inlet water flow due to the asymmetrical orientation and nature of these fins.

As is apparent from FIGS. 12 and 13, the plurality of these fins 58 are not aligned precisely along the centerline of finned electrode 50. This is illustrated, for example, by centerline 84 and fin centerline 82. Centerline 84 passes through center point 70 and the center of a fin 58 at rounded transition 64. Fin centerline 82 passes through the center of both rounded transition 64 and rounded transition 62. Angle 84 is measured as the angle between centerline 84 and fin centerline 82. In the illustrated embodiment, angle 84 is approximately 2.26 degrees. However, it is contemplated and intended as disclosed herein that such angle 84 may vary from approximately 1 to upwards of 4 or 5 degrees while still providing the effects identified herein and also providing sufficient structural support and stiffening for the finned electrodes to function effectively under the conditions of their intended use.

It is also apparent from FIGS. 12 and 13 that while preferred, not all of the fins 58 necessarily are or must be precisely and similarly aligned along the longitudinal depth of water well 51. Most depicted fins 58, for example, display substantially proportionate tapered sides 60. However, several fins 58 appear to display disproportionate tapered sides 60.2 and 60.4. Specifically, tapered side 60.4 appears to be larger than tapered side 60.2 in FIGS. 12-13, but this is believed due to some of the fins being slightly canted in one direction or the other as already described. If desired, similar constructions and beneficial effects could also be achieved by other means, for example, by creating a similar geometry or construct in the forming surface of punch 120 as described above.

Figure 14:
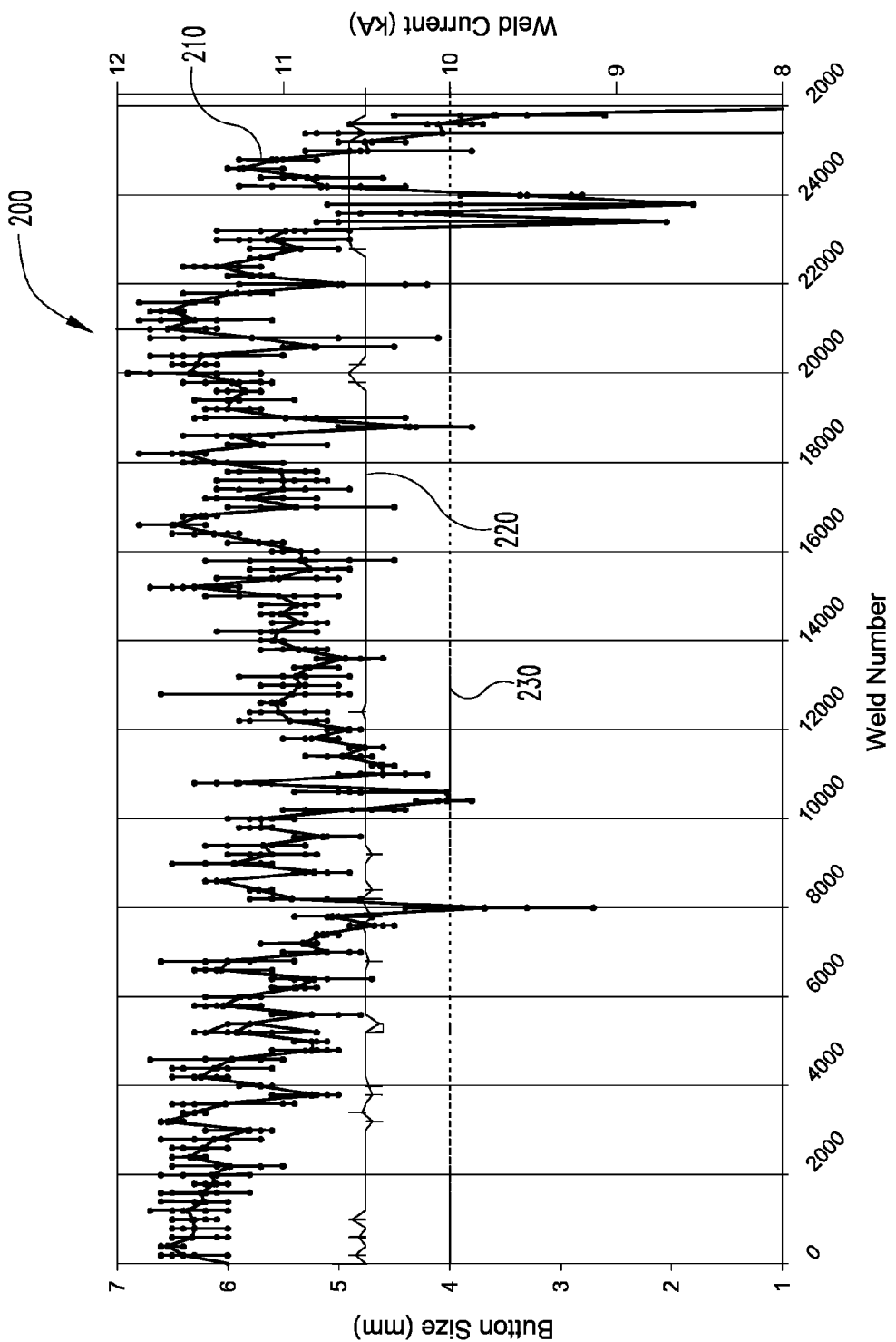
FIG. 14 is a plot of a weld endurance test for a finned cap electrode illustrating button size and weld current versus number of welds.

Referring now to FIG. 14, plot 200 is illustrated. Graph 200 includes the results of endurance testing preformed on a finned electrode 50 with the welding schedule presented below in table 1. Plot 210 depicts button size versus number of welds and plot 220 depicts the weld current versus number of welds. Control line 230 represents the minimum acceptable button size of 4 mm.

TABLE 1

| Cap size | B nose with 4.75 mm weld flat |
|---|---|
| Material welded together | 1.0 mm DDQ Mild Galvanneal to 1.0 mm DDQ Mild Galvanneal |
| Weld force | 600 pounds |
| Squeeze Time | 60 cycles |
| Weld Time | 13 cycles |
| Hold Time | 5 cycles |
| Stepper | None |
| Welds per minute | 30 |
| Water flow | 1.5 gpm |

Regarding face thickness D for finned electrodes 50, 130, 140 and 150 in one or more embodiments herein, a face thickness D between 6 mm and 10 mm has been found acceptable. Depending on the application, this distance could be increased in the manufactured electrode to allow for redressing of the tip as may be desired by individual users. In some embodiments, redressing has been shown to and may remove up to 4 mm of material and correspondingly would reduce the face thickness D by 4 mm as well. In another embodiment, it is envisioned that a 10 mm face thickness could be used effectively for production purposes and the electrodes could then potentially be reworked multiple times to remove up to 4 mm of material still leaving 6 mm face thickness which should provide acceptable results in many applications.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected.

The invention claimed is:

1. A welding electrode comprising:
   a housing comprising an open end, a closed end and a water well formed therein extending from said open end toward said closed end, said water well comprising an end wall portion and a side wall portion;
   a mounting portion proximate to said open end;
   a tip portion proximate to said closed end; and
   a plurality of fins disposed within said water well and extending between said end wall portion and said side wall portion, said fins each comprising a first and second tapered side angled at a taper angle between approximately 10 degrees and 45 degrees.

2. The welding electrode of claim 1, wherein said taper angle is approximately 22 degrees.

3. The welding electrode of claim 1, wherein said side wall portion comprises a straight wall portion substantially parallel to said housing and a conical portion angled between said straight wall portion and said end wall portion.

4. The welding electrode of claim 1, wherein substantially no portion of said fins are cantilevered into said water well.

5. The welding electrode of claim 1, wherein the number of fins is between approximately 6 and 10.

6. The welding electrode of claim 1, further comprising an open area on said end wall portion where said fins do not contact each other.

7. The welding electrode of claim 1, wherein said fins are angled between said side wall portion and said end wall between approximately 20 and 40 degrees.

8. The welding electrode of claim 1, wherein the centerlines of said fins are angled between approximately 1 and 5 degrees from the centerline of said housing.

9. The welding electrode of claim 1, wherein said fins are not aligned along the longitudinal depth of said water well so that said first and second tapered sides are disproportionate when viewed from said open end.

10. The welding electrode of claim 1, wherein the welding electrode is manufactured from a copper alloy material with a minimum Rockwell Hardness of approximately 55 on the B scale.

11. The welding electrode of claim 10, wherein said copper alloy is selected from the group comprising: CuZr, CuCd, CuCr and CuCrZr.

12. The welding electrode of claim 4, further comprising an open area on said end wall portion where said fins do not contact each other.

13. The welding electrode of claim 4, wherein the centerlines of said fins are angled between approximately 1 and 5 degrees from the centerline of said housing.

14. The welding electrode of claim 11, wherein substantially no portion of said fins are cantilevered into said water well.

15. A method comprising:
   spot welding a first and second metal sheet together by squeezing the first and second metal sheet together between a first and second electrode, applying a welding potential across the first and second electrode, thereby generating a weld current through the first and second metal sheets, flowing a cooling fluid through the first and second electrode and holding the first and second metal sheet together after removing the welding potential from across the first and second electrode, wherein the first electrode includes a housing including an open end, a closed end and a water well formed therein extending from the open end toward the closed end, the water well including an end wall portion and a side wall portion, a mounting portion proximate to the open end, a tip portion proximate to the closed end and a plurality of fins disposed within the water well and extending between the end wall portion and the side wall portion, the fins each including a first and second tapered side angled at a taper angle between approximately 10 degrees and 45 degrees.

16. The method of claim 15, further comprising redressing or replacing the first and second electrode only after at least 20,000 welds.

* * * * *